H. HAXTON.
RAT TRAP.
APPLICATION FILED JULY 29, 1911.

1,031,442.

Patented July 2, 1912.

Inventor
Hosea Haxton.

Witnesses

By Victor J. Evans
Attorney

UNITED STATES PATENT OFFICE.

HOSEA HAXTON, OF STARFORD, PENNSYLVANIA.

RAT-TRAP.

1,031,442. Specification of Letters Patent. Patented July 2, 1912.

Application filed July 29, 1911. Serial No. 641,270.

*To all whom it may concern:*

Be it known that I, HOSEA HAXTON, a citizen of the United States, residing at Starford, in the county of Indiana and State of Pennsylvania, have invented new and useful Improvements in Rat-Traps, of which the following is a specification.

The general object of the invention is to prevent the animal from gaining access to the bait in an electrical rat trap without first closing the electric circuit.

Other objects will appear and be better understood from the following description taken in connection with the accompanying drawings, in which—

Figure 1:
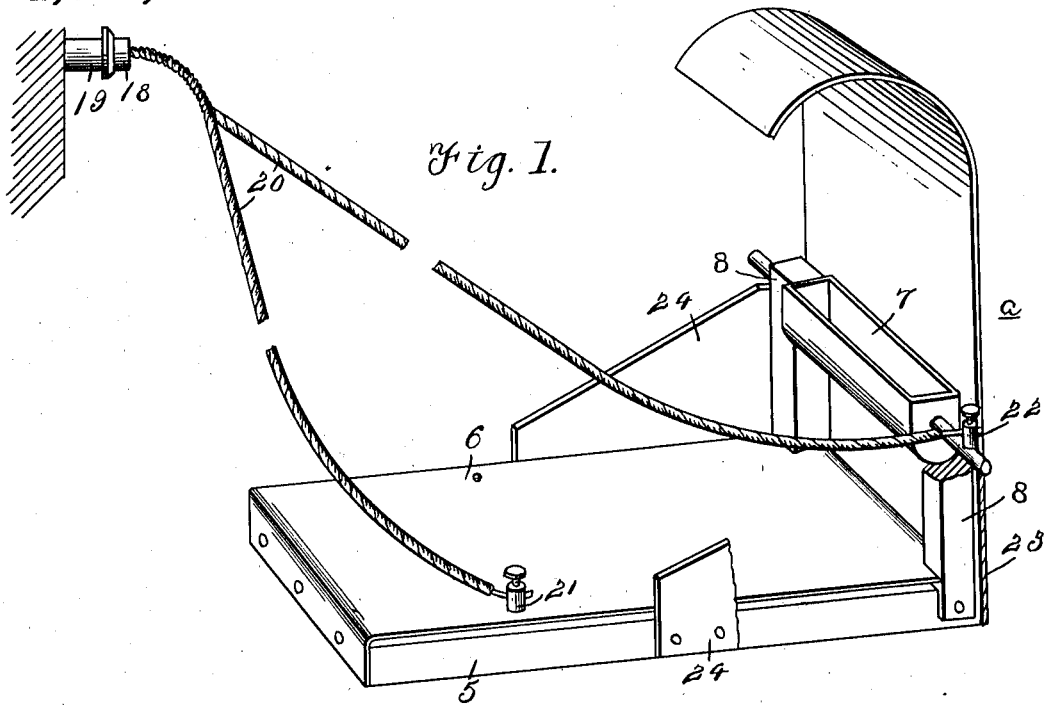
Figure 2:
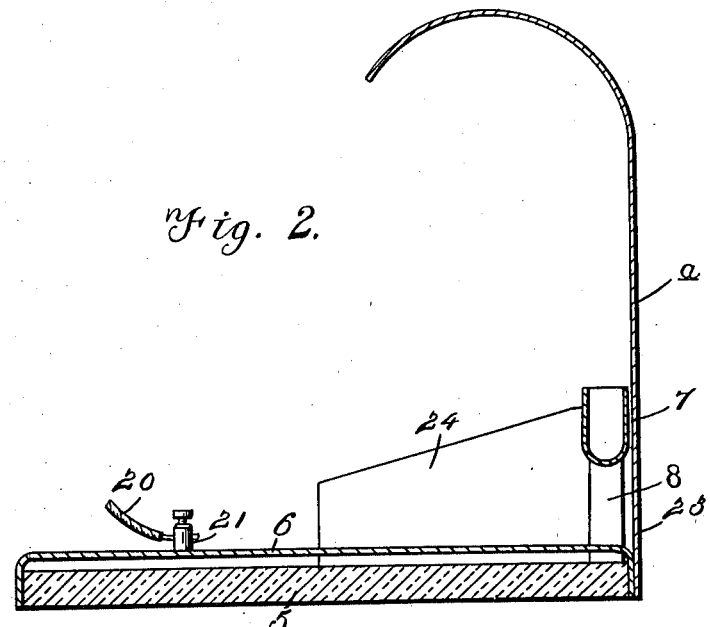

Figure 1 is a perspective of the device partly in section. Fig. 2 is a detail vertical longitudinal section of one end portion of the device.

5 indicates the base plate preferably of porcelain or other insulating material, and may be of any desired dimensions and contour, according to the size of the animals intended to trap, preference being given to a size of base plate which will not accidentally tilt.

6 indicates the tread plate preferably of metal or other conducting material, the said tread plate being suitably secured to the base plate so as to completely cover the upper surface thereof.

7 indicates the bait holder preferably formed of metal or other conducting material, and insulated from the tread plate 6 by means of the posts or uprights 8 which support the bait holder above the tread plate, the said post being preferably of wood or other insulating material, and suitably connected to the base or tread plates, preference being given to a connection between the base plate 5 and the posts 8.

19 indicates an electric light socket and 18 the circuit closing plug carrying the leads or conductors 20, one of which connects to a binding post 21 on the tread plate 6, while the other similarly connects to a binding post 22, connected to the bait holder 7.

A guard $a$ has a portion 23 connected to one end of the base plate, so as to contact with one end of the tread plate, the said portion 23 curving upwardly and over the bait holder 7.

24 indicates lateral projections associated with the portion 23 and which are herein shown as secured to the sides of the base plate 5 and extending beyond the posts 8.

With this construction, it will be seen that the portion 23 of the guard will prevent the animal from gaining access to the bait holder, and in the event of the animal's attempt to get at the contents of the bait holder from either side of the plate 5, the body of the animal will invariably contact with either of the portions 24 and also with the bait holder 7, thus closing the circuit through its body. If the animal approaches the bait holder by moving over the tread plate, the circuit will be closed when the animal places his head in the bait holder and contacts with the same.

Although I have shown and described one embodiment of my invention, it is to be understood that I am not to be limited to the specific arrangement or construction of the parts, since various changes may be made in the scope of the appended claim, without departing from the spirit or sacrificing any of the advantages of the invention.

What I claim as new is:—

An electrical trap comprising a base plate of rectangular configuration and uprights connected to the opposite sides of said plate at one end thereof, of insulating material, a tread plate of conducting material supported by the base plate, a bait holder of conducting material and comprising a trough having bearing members extending through said uprights and securing the trough in alinement with one of the transverse edges of said rectangular base plate, a shield secured to the latter mentioned transverse edge and also to the rear faces of said uprights and extending upwardly in back of said trough member and curving over the top and beyond the front longitudinal edge thereof, guards secured to the side faces of said uprights and to the opposite longitudinal side edges of said base and associating with the lower side edges of said shield for preventing the animal from gaining access to the sides of said bait holder and said shield protecting the rear and top portions of said trough, and an electric circuit including a generator in electrical connection with the tread plate and bait holder.

In testimony whereof I affix my signature in presence of two witnesses.

HOSEA HAXTON.

Witnesses:
 MARY E. DONAHEY,
 SADIE HETRICK.